United States Patent
Nagaraj et al.

(10) Patent No.: US 8,134,577 B2
(45) Date of Patent: Mar. 13, 2012

(54) SYSTEM AND METHOD FOR CHANGING ORIENTATION OF AN IMAGE IN A DISPLAY DEVICE

(75) Inventors: Guruprasad Nagaraj, Bangalore (IN); Krishna Koteshwara Sridhar Murthy, Bangalore (IN)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 12/195,972

(22) Filed: Aug. 21, 2008

(65) Prior Publication Data

US 2009/0073193 A1    Mar. 19, 2009

Related U.S. Application Data

(60) Provisional application No. 60/969,825, filed on Sep. 4, 2007, provisional application No. 61/012,832, filed on Dec. 11, 2007, provisional application No. 61/043,490, filed on Apr. 9, 2008.

(51) Int. Cl.
  *G09G 5/00*    (2006.01)
(52) U.S. Cl. .................. 345/649; 345/659; 345/538
(58) Field of Classification Search .................. 345/659, 345/538, 649
  See application file for complete search history.

(56) References Cited

U.S. PATENT DOCUMENTS

| | | | |
|---|---|---|---|
| 3,976,982 A | 8/1976 | Eiselen | |
| 4,593,407 A | 6/1986 | Konishi et al. | |
| 4,806,920 A * | 2/1989 | Sawada | 345/658 |
| 4,947,344 A * | 8/1990 | Hayashi et al. | 345/658 |
| 4,947,377 A | 8/1990 | Hannai | |
| 5,095,422 A | 3/1992 | Horiguchi | |
| 5,134,390 A * | 7/1992 | Kishimoto et al. | 345/659 |
| 5,189,404 A * | 2/1993 | Masimo et al. | 345/659 |
| 5,208,914 A * | 5/1993 | Wilson et al. | 710/39 |
| 5,329,289 A * | 7/1994 | Sakamoto et al. | 345/659 |
| 5,640,517 A * | 6/1997 | Parks et al. | 710/105 |
| 5,751,293 A | 5/1998 | Hashimoto et al. | 345/430 |
| 5,973,664 A * | 10/1999 | Badger | 345/659 |
| 6,173,089 B1 | 1/2001 | Van Lerberghe | 382/299 |
| 6,330,374 B1 * | 12/2001 | Yamaguchi et al. | 382/297 |
| 6,346,972 B1 * | 2/2002 | Kim | 348/569 |
| 6,405,280 B1 * | 6/2002 | Ryan | 711/105 |
| 6,470,098 B2 * | 10/2002 | Yamaguchi et al. | 382/284 |
| 6,639,603 B1 * | 10/2003 | Ishii | 345/568 |
| 6,757,447 B2 * | 6/2004 | Yamaguchi et al. | 382/293 |
| 6,760,035 B2 | 7/2004 | Tjandrasuwita | 345/545 |
| 6,819,334 B1 * | 11/2004 | Owada et al. | 345/659 |
| 6,904,473 B1 * | 6/2005 | Bloxham et al. | 710/22 |
| 7,113,194 B2 * | 9/2006 | Mamona et al. | 345/649 |
| 7,120,317 B1 * | 10/2006 | Wu et al. | 382/296 |
| 7,259,772 B2 * | 8/2007 | Koh | 345/659 |

(Continued)

OTHER PUBLICATIONS

International Search Report and Written Opinion dated Jun. 1, 2009.

(Continued)

*Primary Examiner* — M Good Johnson
(74) *Attorney, Agent, or Firm* — KED & Associates LLP

(57) ABSTRACT

A method for displaying an image in a display device initially includes storing a plurality masks in a memory. A mask of the plurality of masks is selected randomly from the plurality of masks, when control information is received for a source image and used to change the orientation of the source image. Each mask controls the transfer of image lines in a different non-sequential order based on the control information.

33 Claims, 8 Drawing Sheets

U.S. PATENT DOCUMENTS

| | | | |
|---|---|---|---|
| 7,411,620 B2 | 8/2008 | Taniguchi et al. | |
| 7,411,630 B2 * | 8/2008 | Kim et al. | 348/716 |
| 7,528,837 B2 | 5/2009 | Kitagawa | |
| 7,587,524 B2 | 9/2009 | Cho et al. | |
| 7,701,472 B2 * | 4/2010 | Obinata | 345/649 |
| 7,742,063 B2 | 6/2010 | Leung et al. | |
| 7,751,652 B2 * | 7/2010 | Tighe | 382/298 |
| 7,800,634 B2 * | 9/2010 | Baek et al. | 345/649 |
| 2002/0057242 A1 | 5/2002 | Yoneda et al. | 345/87 |
| 2002/0091916 A1 * | 7/2002 | Dowling | 712/228 |
| 2002/0101439 A1 | 8/2002 | Mamona et al. | 345/649 |
| 2002/0186229 A1 | 12/2002 | Brown Elliott | 345/649 |
| 2003/0016226 A1 | 1/2003 | Lu et al. | 345/555 |
| 2004/0125103 A1 | 7/2004 | Kaufman et al. | 345/419 |
| 2004/0252135 A1 | 12/2004 | Ono | 345/619 |
| 2005/0152197 A1 | 7/2005 | Cho et al. | |
| 2006/0033760 A1 | 2/2006 | Koh | 345/649 |
| 2006/0056738 A1 | 3/2006 | Keithley et al. | 382/307 |
| 2007/0005795 A1 * | 1/2007 | Gonzalez | 709/232 |
| 2008/0285652 A1 | 11/2008 | Oxman et al. | |

OTHER PUBLICATIONS

International PCT Search Report and Written Opinion dated Jun. 18, 2009.

PCT International Search Report dated Jul. 28, 2009.

U.S. Office Action dated May 12, 2011 for related U.S. Appl. No. 12/195,873.

U.S. Office Action dated May 13, 2011 for related U.S. Appl. No. 12/195,649.

U.S. Office Action dated Nov. 15, 2011 for related U.S. Appl. No. 12/195,873.

U.S. Office Action dated Nov. 16, 2011 for related U.S. Appl. No. 12/195,649.

* cited by examiner

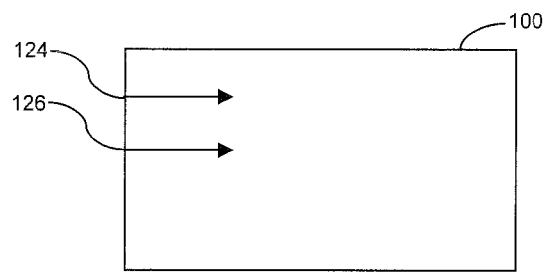
Fig. 1 (a)
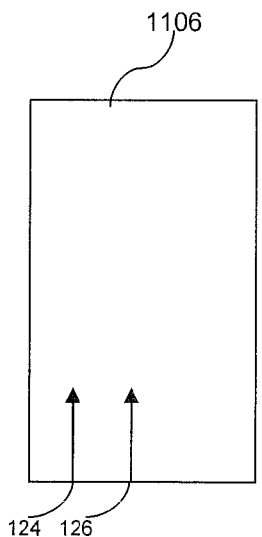
Fig. 1 (b)
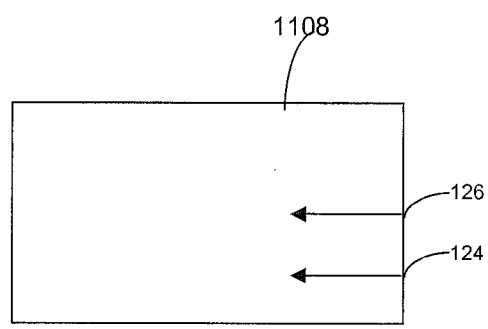
Fig. 1 (c)
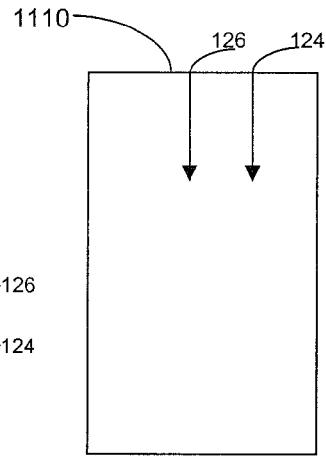
Fig. 1 (d)
FIG. 1

SYSTEM AND METHOD FOR CHANGING ORIENTATION OF AN IMAGE IN A DISPLAY DEVICE

This application claims priority to Provisional Application Nos. 60/969,825 filed Sep. 4, 2007, 61/012,832 filed Dec. 11, 2007 and 61/043,490 filed Apr. 9, 2008 whose entire disclosures are incorporated herein by reference.

FIELD

One or more embodiments described herein relate to the processing of images for presentation on a display device.

BACKGROUND

When viewing an image on a display device, it may be desirable to rotate or change the orientation of the image to obtain a more pleasing viewing experience or for a variety of other reasons. While systems have been developed to rotate an image on a display, these systems have significant drawbacks. Also, many systems and methods have prolonged processing times and other inefficiencies which make them undesirable, especially from the standpoint of the user.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 1(a) is a diagram showing a source image, and FIGS. 1(b)-(d) show different examples of how the orientation of the source image may be changed in accordance with one or more embodiments described herein;

DETAILED DESCRIPTION

FIG. 1(a) shows a source image 100 formed from a plurality of lines, each containing a plurality of pixels. The source image may include text, graphics, video, or other information capable of being viewed on a display device, which, for example, may be a television or monitor, the latter of which may be provided alone or within a processing device such as a notebook or desktop computer. More specific examples of the display device include but are not limited to a Liquid Crystal Display (LCD), Thin Film Transistor (TFT) LCD, a plasma display panel (PDP), and an electroluminescent display (organic or inorganic). In another embodiment, the source image may be capable of being viewed on a digital picture frame, digital signage and the like.

Under normal conditions, the source image is displayed in a predetermined orientation. However, in certain circumstances, it may be desirable to change the orientation of the source image prior to display. The source image may have its orientation changed in response to a user command or by other techniques including, for example, manipulating the screen of a rotatable monitor. In this latter instance, a user may rotate the screen to a desired position and the orientation of a source image may be changed to fit the rotated position of the screen in accordance with one or more embodiments disclosed herein.

For illustrative purposes, FIGS. 1(b)-(c) show how source image 100 may be rotated at various angles to produce corresponding display images. When the source image is rotated by 90°, display image 1106 in FIG. 1(b) is produced. When the source image is rotated by 180°, display image 1108 shown in FIG. 1(c) is produced. And, when the source image is rotated by 270°, display image 1110 shown in FIG. 1(d) is produced.

Figure 2:
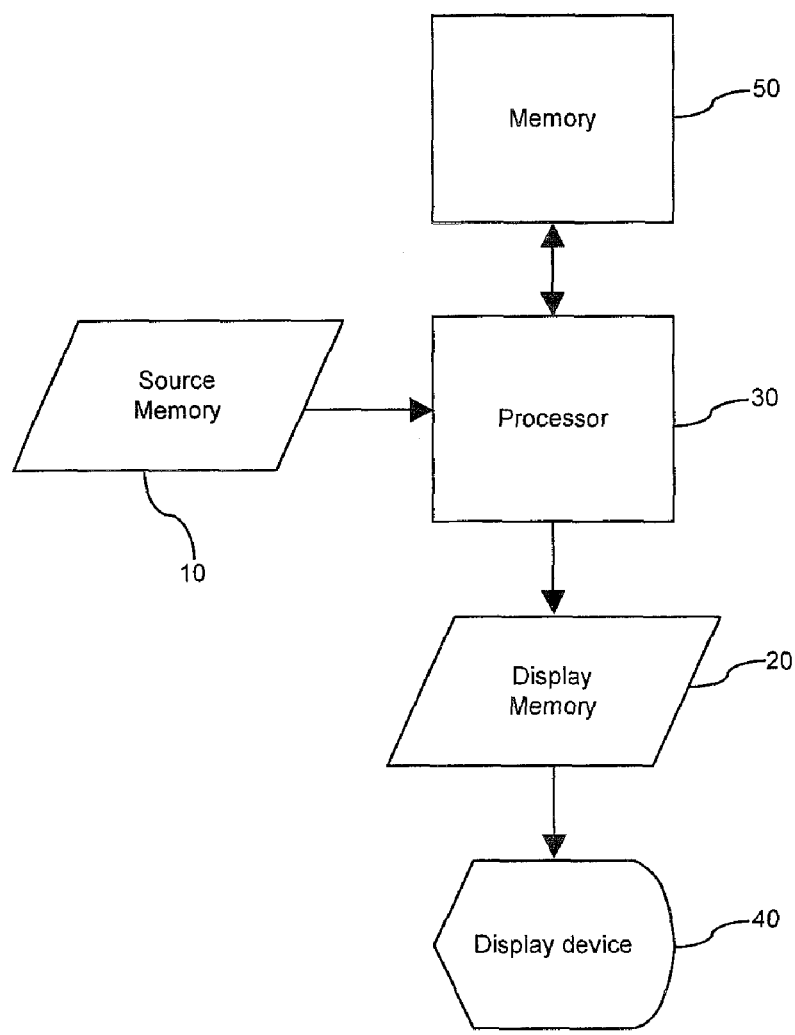
FIG. 2 is a diagram showing one embodiment of a system for changing an orientation of a source image to generate a display image.

FIG. 2 shows one embodiment of a system that may be used to rotate or otherwise change the orientation of the source image to produce a display image. The system includes a source memory 10, a display memory 20, and a processor 30. The source memory is used to store the source image and the display memory is used to store the image to be displayed. The source and display memories may correspond to different sections of a common memory unit or, for example, may be located on different integrated circuit chips.

In order to perform an orientation change, processor 30 controls the translation of pixels from the source memory to the display memory. The said operation is performed by a driver. The driver translates the pixels to locations in the display memory based on the change in orientation desired. Various memory pointers are controlled to perform the translation. As will be described in greater detail, the order in which pixels are translated to the display memory is performed using a mask, which, for example, may be stored in a memory 50 coupled to the processor 30. Display device 40 outputs the image in the display memory, which image corresponds to the desired change in orientation of the source image.

Thus, for example, if the source image in FIG. 1(a) is to be rotated 90° for display, the pixels in line 124 of the source image are translated into positions in the display memory (e.g., a set of memory addresses) that correspond to the location of the pixels in line 124 as it appears in image 1106. The remaining lines of the source image are translated in like manner. Display images 1108 and 1110 represent 180° and 270° rotations of the source image respectively. While the rotational angles of 90°, 180°, and 270° are provided as examples, those skilled in the art can appreciate that the source image may be rotated to any angle in accordance with the embodiments disclosed herein.

Figure 3:
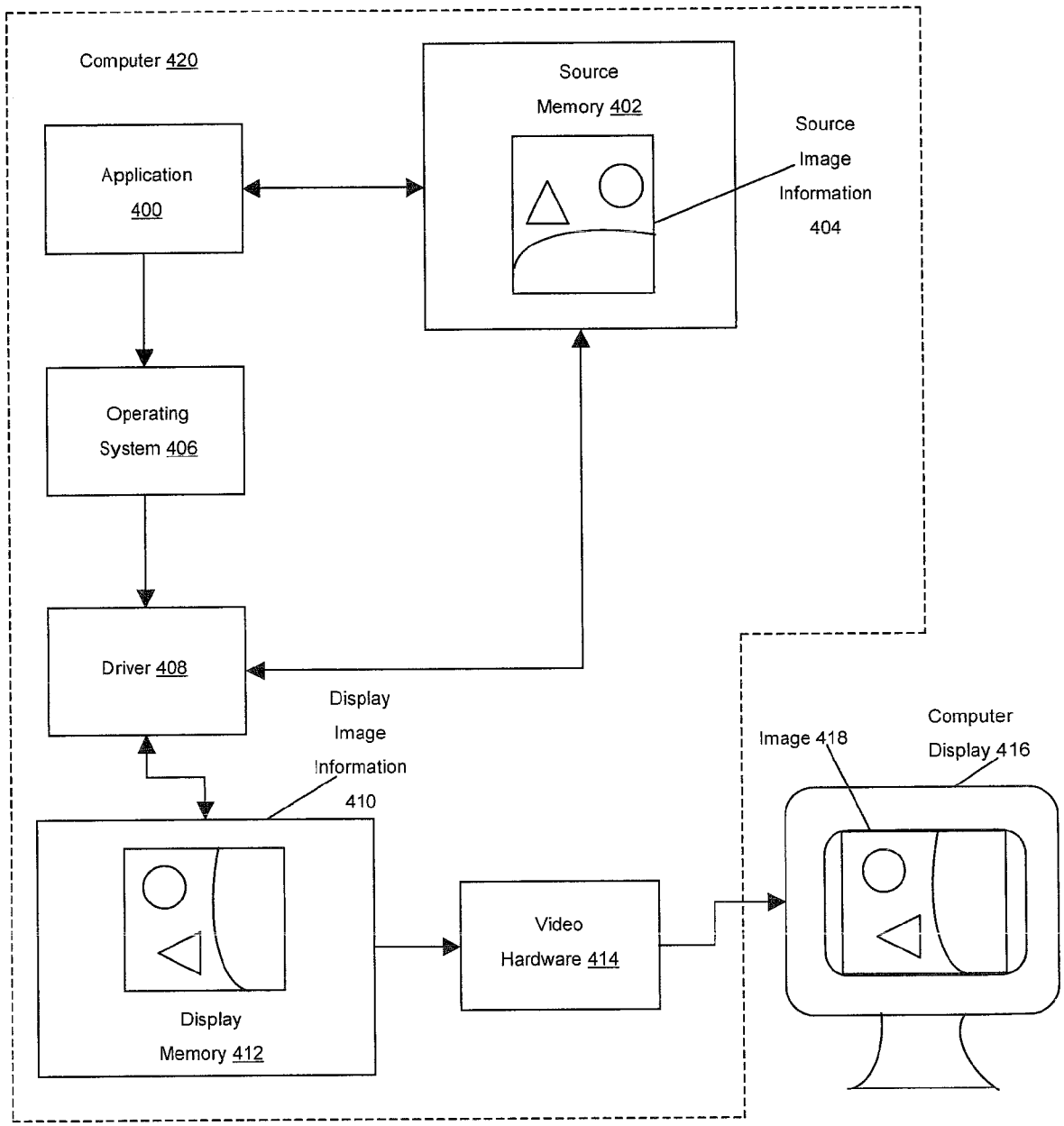
FIG. 3 is a diagram showing another embodiment of a system for changing an orientation of a source image to generate a display image.

FIG. 3 is a diagram showing another embodiment of a system for changing an orientation of a source image to generate a display image. Computer display 416 exhibits image 418 based on display image information 410 stored in display memory 412 which is accessible by computer 420. This display memory 412 is organized into arrays of memory cells, and the organization of information in display memory 412 takes the form of contiguous blocks of memory which each represent a single horizontal line of pixels on the display.

Video hardware 414 uses display image information 410 in display memory 412 to generate display signals for computer display 416. The appearance of image 418 on computer display 416 is determined by the organization of information 410 placed in display memory 412. When software application 400, such as a word processor or a drawing program, needs to put an image 404 on display screen 416, it typically places image information 404 in source memory 402. Software application 400 then signals operating system 406 that image 404 in source memory 402 needs to be put on display screen 416.

Operating system 406 then communicates this information to driver 408. Driver 408 is a small software program which performs the task of retrieving source image information 404 from source memory 402 and putting it into display memory 412. If any modifications to the orientation of image 404 are necessary, driver 408 performs these modifications while writing display image information 410 to display memory 412. Driver 408 performs all modifications to image 404 using a single parameterized method of operation that can be used to rotate image 404 for any of a number of orientation modes.

Figure 4:
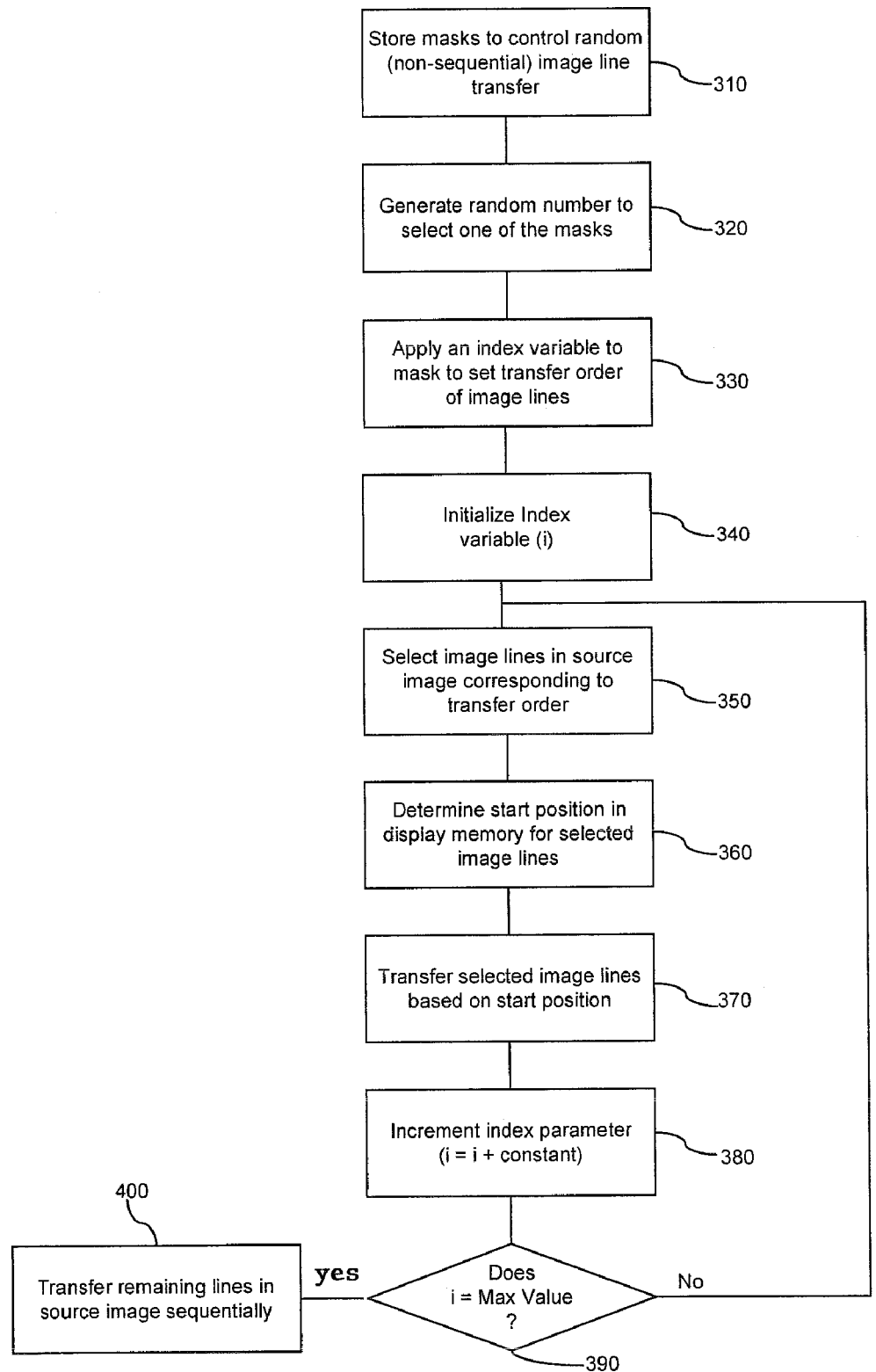
FIG. 4 is a diagram showing steps included in one embodiment of a method for changing orientation of a source image to generate a display image.

FIG. 4 shows steps included in one embodiment of a method for changing the orientation of a source image for display. In accordance with this embodiment, the image lines in the source image are transferred from the source memory to the display memory in a random, non-sequential order in accordance with orientation change information received from a user or host system. As with all embodiments disclosed herein, the method may be implemented using the system shown in FIG. 2 or 3 or another system may be used. The method of FIG. 3 may be understood with reference to examples of how orientation of the source image may be changed as shown in FIGS. 1(b)-(d). In these examples, the change of orientation is in the form of an image rotation. In other embodiments, a different change in orientation may be performed, e.g., mirror image, etc.

In a first step, one or more masks are stored in memory 50 of the system. (Block 310). Each mask includes a different combination of values that are to be used in controlling the transfer order of image lines from the source memory to the display memory. The values and their order in each mask are constant. Therefore, the masks themselves may be considered to be constants. According to one embodiment, the masks may have the same number of values. However, in other embodiments the number of values may differ from mask to mask.

According to one example, the following five masks may be stored in memory. Each mask is used to control a different non-sequential transfer order of images lines into the display memory.

Mask 2=[+4,+0,+2]

Mask 3=[+1,+2,+0]

Mask 4=[+2,+0,+1]

Mask 5=[+2,+1,+0]

In a second step, a random number is generated to select one of the masks. (Block 320). In the example shown above, a random number between 0 and 4 (inclusive) is selected.

In a third step, an index variable is applied to the selected mask to define a transfer order of a first set of image lines to be transferred from the source memory to the display memory. (Block 330). In applying the index variable to the mask, the index variable must first be initialized to some starting value, e.g., 0. (Block 340). Applying this initialized index variable to the mask will identify a certain number of lines that are to be transferred in non-sequential order from the source memory to the display memory.

The number of lines to be transferred is based on the number of elements in the selected mask. If one of Masks 1-5 is selected, then applying the index variable to the mask will result in transferring lines equal to a size of (mask), i.e. number of elements in the mask, i.e. three lines at a time from the source memory to the display memory. By way of example, consider the case where an index variable (i) is applied to Mask 3, with i initialized to a value of 0. Then, applying i to Mask 3 will produce a transfer order of: i+1, i+2, and i+0 which define a transfer order of lines 1, 2, and 0 for the source image or memory.

In a fourth step, image lines in the source image, or memory, are selected according to the transfer order produced by applying the initialized index variable to the mask. (Block 350). In the above example with Mask 3 selected, image lines 1, 2, and 0 in the source image, or memory, are selected for transfer.

In a fifth step, based on the designated orientation change, the line start position in the display memory is determined for the selected image lines. (Block 360). Thus, for example, if the designated orientation change corresponds to a 90° rotation and line 126 in the source image corresponds to line 1 in the transfer order of 1, 2, and 0, then the line start position corresponding to line 126 as it appears in the rotated image of FIG. 1(b) is determined. The orientation change may be designated, for example, as a result of a user selecting one of a plurality of predetermined designations from a menu or by typing information or otherwise designating a specific orientation change to be implemented. As will be described in greater detail, this line start position corresponds to the location of an address pointer for the display memory.

In a sixth step, the selected image lines are transferred from the source memory to the display memory in the transfer order and line position determined in the previous steps for the desired orientation change. (Block 370). Memory pointers of the source and display memories are controlled to transfer the pixels in each line, and the lines themselves, based on the non-sequential order designated by the mask. The pixels in each line are transferred sequentially from the source memory to the display memory. However, in other embodiments, the pixels may also be transferred randomly as determined by the transfer order.

In other words, once the transfer has taken place in Block 370, the index variable is incremented by the size of (mask) (Block 380) and a determination is made as to whether there are any image lines remaining to be transferred from the source memory to the display memory. Blocks 350 to 390 are repeated if the remaining image lines are more than or equal to the size of (mask). But, if the image lines remaining to be transferred from the source memory to the display memory is less than the size of (mask), the remaining lines are transferred sequentially from the source memory to the display memory. (Block 400).

Thus, according to the processing sequence set forth above, one of a plurality of masks is randomly selected to control the transfer of a different non-sequential order of image lines from the source memory to the display memory in order to achieve the change in orientation desired to be displayed.

As a more detailed example, consider the case where the source image has a total of 11 lines, i.e., numbered 0 to 10. Initially, a random number is generated to select one of the masks. If the random number is 3, constant Mask 3 is selected. Index variable (i) is then applied to the mask as follows: i+[+1, +2, 0]. In this equation, Mask 3 (as well as the other masks) may be considered to be constants which do not change. Applying the index variable to Mask 3 may therefore have the effect of producing the following mathematical expression: (i+1, i+2, i).

Next, an initial value is set for the index variable, e.g., i=0. The image in the source memory is now ready to be transferred into the display memory based on the desired orientation (e.g., rotate counterclockwise by 90°) and a line start position determined for that orientation. Using the mask and index variable combination, the transfer is accomplished in the following order with index variable i=0:

$$\text{Image Line Tranfer Order} = (i+1, i+2, i+0)$$
$$= (0+1, 0+2, 0+0)$$
$$= 1, 2, 0$$

To transfer the next group of lines, index variable is incremented to i=3 and this value is applied to the mask:

$$\text{Image Line Transfer Order} = (i+1, i+2, i+0)$$
$$= (3+1, 3+2, 3+0)$$
$$= 4, 5, 3$$

To transfer the next group of lines, index variable is once again incremented to i=6 and this value is applied to the mask:

$$\text{Image Line Transfer Order} = (i+1, i+2, i+0)$$
$$= (6+1, 6+2, 6+0)$$
$$= 7, 8, 6$$

The final image lines (namely, image line 9 and image line 10) are transferred sequentially into the display memory at a location which corresponds to the last position of the desired orientation. The image lines 9 and 10 can be transferred in any order, i.e. either initially line 9 can be transferred or initially line 10 can be transferred The image line transfer is therefore performed in either the following order: 1, 2, 0, 4, 5, 3, 7, 8, 6, 9, 10, or the following order: 1, 2, 0, 4, 5, 3, 7, 8, 6, 10, 9.

Thus, according to one or more embodiments described herein, the lines in the source image are transferred to the display memory in a random, non-sequential order using one of a plurality of predetermined masks applied with an index variable. By using such a mask and index variable combination, different Y increment values (Y increment corresponding to an image line) control the transfer of image lines from the source memory to the display memory. As a result, the embodiments described herein do not step seriatim through each image line of the source memory. This is clear from the example discussed above, where the following Y increment values are used to transfer lines in the source image into the display memory:

| Transferred Source Image Line | Y Increment Value |
|---|---|
| 1 | — |
| 2 | 1 |
| 0 | 2 |
| 4 | 4 |
| 5 | 1 |
| 3 | 2 |
| 7 | 4 |
| 8 | 1 |
| 6 | 2 |
| 9 | 3 |
| 10 | 1 |

Figure 5:
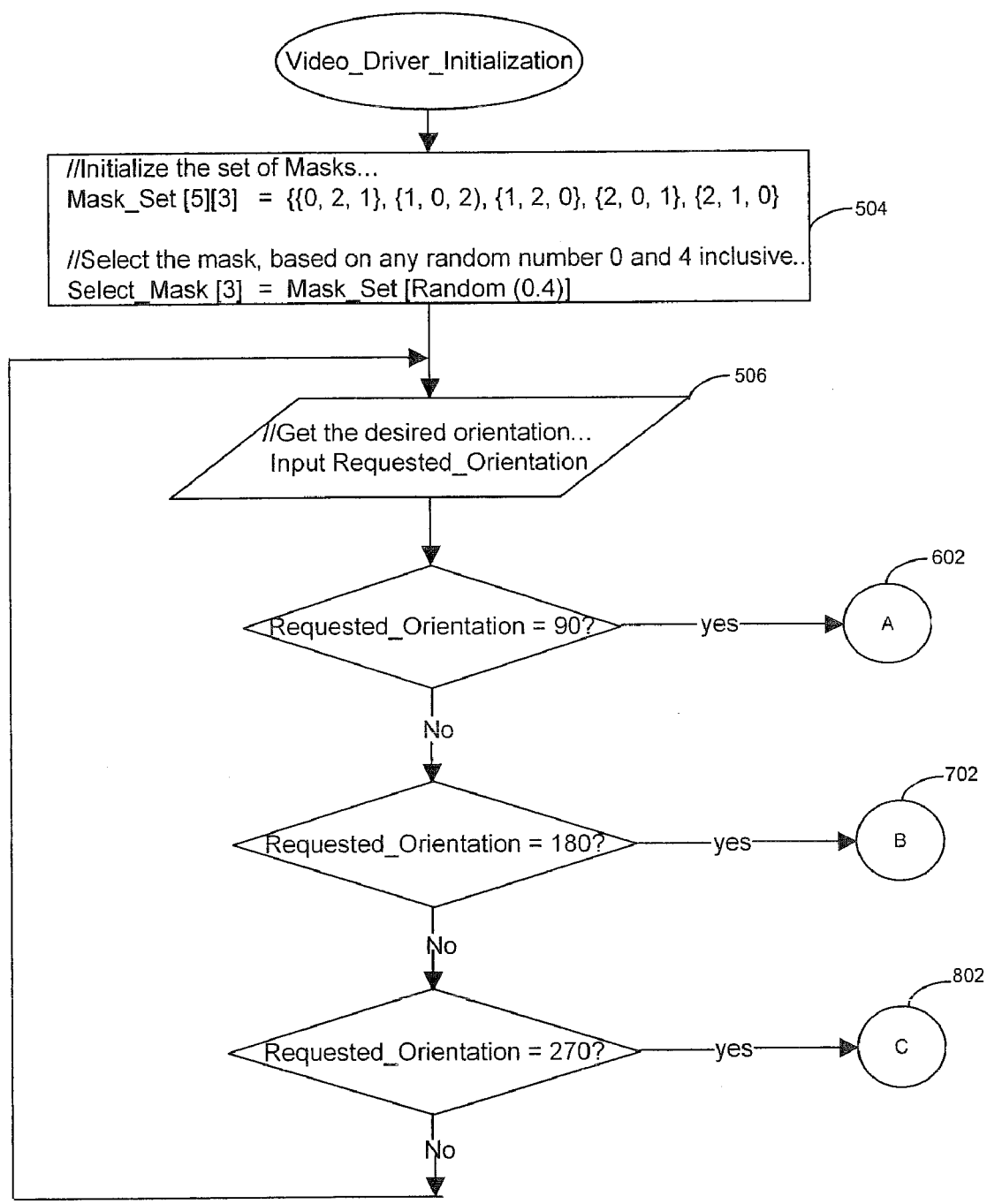
FIG. 5 is a flow diagram illustrating initialization of a plurality of variables for rotation of an image, according to an embodiment of the present invention.

FIG. 5 is a flow diagram illustrating initialization of a plurality of variables for rotation of an image according to an embodiment of the present invention. The flow diagram provides a detailed indication of how the orientation of a source image may be changed, by updating various parameters that control movement of memory pointers for the source and display memories.

The driver initializes a plurality of variables at step 504, for example, a Mask_Set[5][3] variable is set equal to {{0,2,1}, {1,0,2},{1,2,0},{2,0,1},{2,1,0}}. The Mask_set[5] [3] is an array of integers having five rows and three columns, where each row of the mask_set[5][3] specifies a mask. Thereafter, at step 504, a Select_mask [3] variable is set equal to Mask_Set [Random [0, 4]]. That is a mask is selected randomly from among the five masks defined in a Mask_set [5] [3]. Step 504 is performed at a boot time initialization of the driver.

Thereafter, at run time, step 506, the angle of rotation of the image is determined. If the angle of rotation of the image is 90 degree then, the control goes to step 602. If the angle of rotation of the image is 180 degree then, the control goes to step 702. If the angle of rotation of the image is 270 degree then, the control goes to step 802. If the angle of rotation of the image is 0 degree, then the image is displayed as it is. The detailed rotation of the image in case of angle of rotation of 90, 180, and 270 degree will be described in conjunction with FIG. 6, FIG. 7, and FIG. 8 respectively. Once the rotation of the image is completed, control may return, for example, to box 506 in FIG. 5 or another box (e.g., a mask initialization and/or selection step) so that rotation of the same or another image may be performed.

Figure 6:
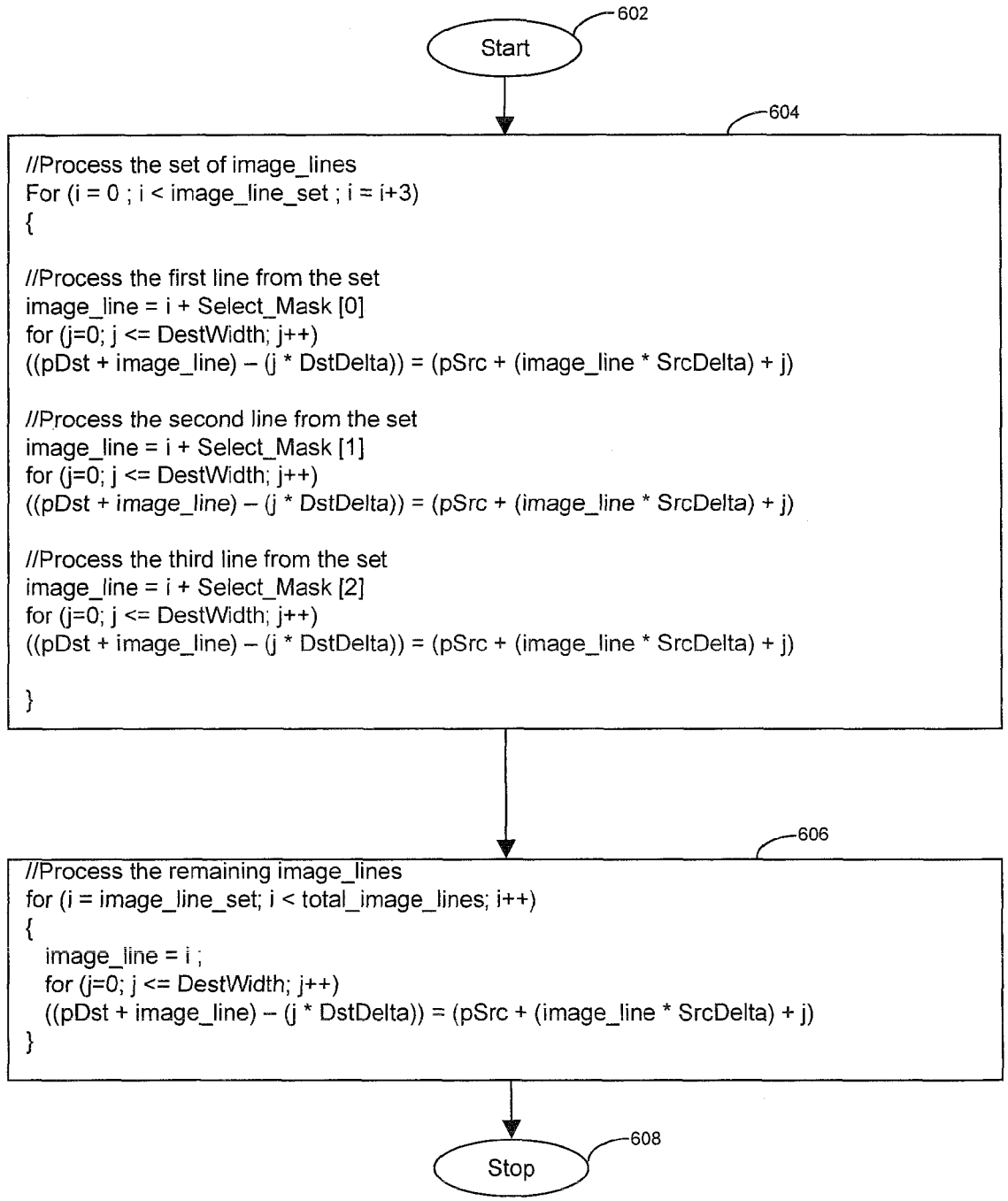
FIG. 6 is a flow diagram illustrating an algorithm for rotation of the image at an angle of 90 degree, according to an embodiment of the present invention.

FIG. 6 is a flow diagram illustrating a pseudo code for rotation of the image at an angle of 90 degree, according to an embodiment of the present invention. The algorithm includes initialization of a plurality of variables that are used for rotating the image at the angle of rotation of 90 degree.

The plurality of variables include SrcWidth, SrcHeight, DstWidth, DstHeight, SrcPtr, DestPtr, SrcDelta, DstDelta, total_image_lines, pSrc, pDst and Image_line_set. The SrcWidth variable is set equal to the width of the image in pixels in the source memory. The SrcHeight variable is set equal to the height of the image in pixels in the source memory. The DstWidth variable is set equal to width of the image in pixels in a display memory. The DstHeight variable is set equal to height of the image in pixels in the display memory. The SrcPtr is the source memory base pointer, and the DestPtr is a destination memory (i.e. Display memory) base pointer.

The SrcDelta is set equal to the product of the SrcWidth variable and the size of pixel. The DstDelta is set equal to the product of the DstWidth variable and the size of pixel. The total_image_lines variable is set equal to the DstHeight variable. The pSrc variable is set equal to the SrcPtr variable. The pDst variable is set equal to a sum of DestPtr and a product of DstDelta variable and the DstHeight variable. The image_line_set variable is set equal to integer value of (DstHeight/size of (mask_set))*(size of (mask_set)).

The size of (mask_set) signifies, the number of integers in a particular row of an array mask_set. For example, in the mask_set [5] [3], the number of integers are 3, therefore the size of (mask_set) is equal to 3. Thus, the image_line_set is set equal to a multiple of size of (mask_set). For example, if the total lines to be transferred is 11, then the image_line_set may be set equal to integer value of (DstHeight/size of (mask_set))*(size of (mask_set)), therefore integer value of (11/3)*3, which is set equal to 9. The method is initiated at step 602.

At step 604, a pseudo code is used for rotating the image at the angle of rotation of 90 degree. The pseudo code includes rotating the image_lines selected in a random order in a block size of size of (mask_set). Further, the block of image_lines is determined based on applying an index variable to a pre-determined Select_Mask.

Thereafter, a for loop is initialized, and set as for (i=0; i<image_line_set; i=i+3). Thereafter, image_line is set equal to i+Select_Mask [0], and another for loop is initialized, for (j=0; j<=DestWidth; j++), and ((pDst+image_line)−(j*DstDelta)) is set equal to (pSrc+(image_line*SrcDelta)+j), thereafter, image_line is set equal to i+Select_Mask [1], and another for loop is initialized, for (j=0; j<=DestWidth; j++), and ((pDst+image_line)−(j*DstDelta)) is set equal to (pSrc+(image_line*SrcDelta)+j), thereafter, image_line is set equal to i+Select_Mask [2], and another for loop is initialized, for (j=0; j<=DestWidth; j++), and ((pDst+image_line)−(j*DstDelta)) is set equal to (pSrc+(image_line*SrcDelta)+j).

The said pseudo code results in each of the three image lines selected randomly to be transferred sequentially from the source memory to the display memory oriented at the angle of rotation of 90 degree in the display memory. Thereafter, the value of i is incremented and the above mentioned pseudo code is repeated till each of the lines in the image_line_set is transferred sequentially to the display memory.

For example, if i=0, we determine i+[+1, +2, +0] and transfer order is line [1, 2, 0], that is image lines '1', '2' and '0' are selected in the source memory and transferred to the display memory based on the angle of rotation of 90 degree, thereafter, i is incremented by 3, and i is now updated to 3, then i is set as i+[+1, +2, +0], and transfer order of the image lines is [4, 5, 3], that is image lines '4', '5' and '3' are selected in the source memory and transferred to the display memory based on the angle of rotation of 90 degree, thereafter i is incremented by 3, and I is now updated to 6, then i is set as i+[+4, +2, +0], and transfer order of the image lines is [7, 8, 6], that is image lines '7', '8' and '6' are selected in the source memory and transferred to the display memory based on the angle of rotation of 90 degree.

Thereafter, at step 606, the pseudo code is used for transferring the remaining lines, i.e. 2 lines left from among the 11 lines to the display memory from the source memory. The for loop is initialized and set equal to for (i=image_line_set; i<, total_image_lines; i++), thereafter, an image_line variable is set equal to the variable I, and another for loop is initialized, for (j=0; j<=DestWidth; j++), and ((pDst−(image_line*DstDelta))−j) is set equal to (pSrc+(image_line*SrcDelta)+j), hence each of the remaining lines, that is lines '9' and '10' are transferred sequentially from the source memory to the display memory based on the angle of rotation of 90 degree. The method terminates at step 608.

Figure 7:
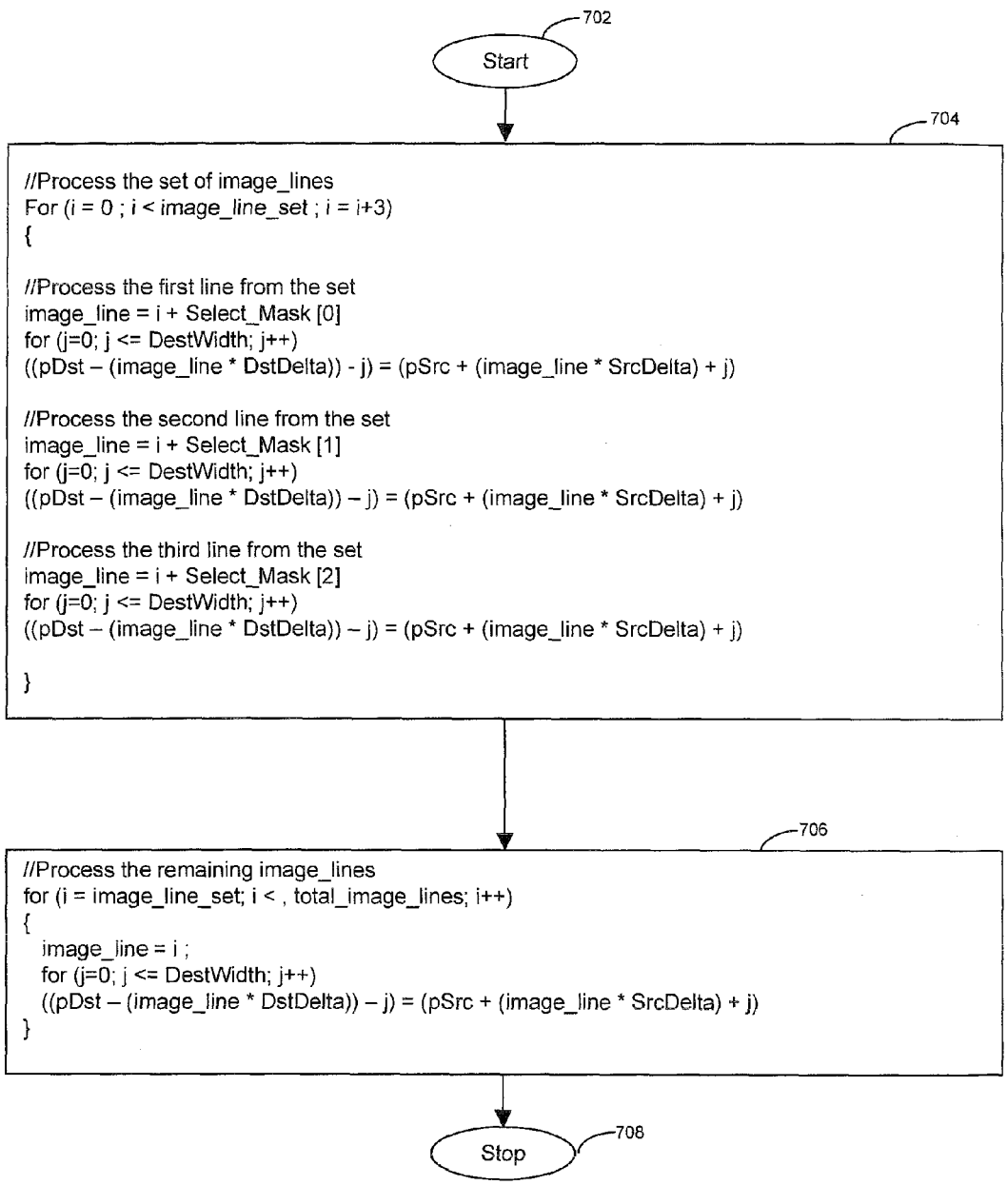
FIG. 7 is a flow diagram illustrating an algorithm for rotation of the image at an angle of 180 degree, according to an embodiment of the present invention.

FIG. 7 is a flow diagram illustrating a pseudo code for rotation of the image at an angle of 180 degree, according to an embodiment of the present invention. The algorithm includes initialization of a plurality of variables that are used for rotating the image at the angle of rotation of 180 degree.

The plurality of variables include SrcWidth, SrcHeight, DstWidth, DstHeight, SrcPtr, DestPtr, SrcDelta, DstDelta, total_image_lines, pSrc, pDst and Image_line_set. The SrcWidth variable is set equal to the width of the image in pixels in the source memory. The SrcWidth variable is set equal to the height of the image in pixels in the source memory. The DstWidth variable is set equal to width of the image in pixels in a display memory. The DstHeight variable is set equal to height of the image in pixels of the image in the display memory.

The SrcPtr is the source memory base pointer, and the DestPtr is a destination memory (i.e. Display memory) base pointer. The SrcDelta is set equal to the product of the SrcWidth variable and the size of pixel. The DstDelta is set equal to the product of the DstWidth variable and the size of pixel. The total_image_lines variable is set equal to the DstHeight variable. The pSrc variable is set equal to the SrcPtr variable. The pDst variable is set equal to a sum of DestPtr and (a sum of a product of DstDelta variable and the DstHeight variable, and the Dstwidth variable. The image_line_set variable is set equal to integer value of (DstHeight/size of (mask_set))*(size of (mask_set)).

The size of (mask_set) signifies, the number of integers in a particular row of an array mask_set. For example, in the mask_set [5] [3], the number of integers in a given row are 3, therefore the size of (mask_set) is equal to 3. Thus, the image_line_set is set equal to a multiple of size of (mask_set). For example, if the total lines to be transferred is 11, then the image_line_set is set equal to integer value of (DstHeight/size of (mask_set))*(size of (mask_set)), therefore integer value of (11/3)*3, which is set equal to 9. The method is initiated at step 702.

At step 704, a pseudo code is used for rotating the image at the angle of rotation of 180 degree. The pseudo code includes rotating the image_lines selected in a random order in a block size of size of (mask_set). Further, the block of image_lines is determined based on applying an index variable to a pre-determined Select_Mask.

Thereafter, a For loop is initialized and set as for (i=0; i<image_line_set; i i+3). Thereafter, image_line is set equal to i+Select_Mask [0], and another for loop is initialized, for (j=0; j<=DestWidth; j++), and ((pDst−(image_line*DstDelta))−j) is set equal to (pSrc+(image_line*SrcDelta)+j), thereafter, image_line is set equal to i+Select_Mask [1], and another for loop is initialized, for (j=0; j<=DestWidth; j++), and ((pDst−(image_line*DstDelta))−j) is set equal to (pSrc+(image_line*SrcDelta)+j), Thereafter, image_line is set equal to i+Select_Mask [2], and another for loop is initialized, for (j=0; j<=DestWidth; j++), and (pDst−(image_line*DstDelta))−j) is set equal to (pSrc+(image_line*SrcDelta)+j).

The said pseudo code results in each of the three image_lines selected randomly to be transferred sequentially from the source memory to the display memory oriented at the angle of rotation of 180 degree in the display memory. Thereafter, the value of i is incremented and the above mentioned pseudo code is repeated till each of the lines in the image_line_set is transferred sequentially to the display memory.

For example, if i=0, we determine i+[+1, +2, +0] and transfer order is line [1, 2, 0], that is image lines '1', '2' and '0' are selected in the source memory and transferred to the display memory based on the angle of rotation of 180 degree, thereafter, i is incremented by 3, and i is now updated to 3, then i is set as i+[+1, +2, +0], and transfer order of the image lines is [4, 5, 3], that is image lines '4', '5' and '3' are selected in the source memory and transferred to the display memory based on the angle of rotation of 180 degree, thereafter i is incremented by 3, and 1 is now updated to 6, then i is set as i+[+1, +2, +0], and transfer order of the image lines is [7, 8, 6], that is image lines '7', '8' and '6' are selected in the source memory and transferred to the display memory based on the angle of rotation of 180 degree.

Thereafter, at step 706, the pseudo code is used for transferring the remaining lines, i.e. 2 lines left from among the 11 lines to the display memory from the source memory. The for loop is initialized and set equal to for (i=image_line_set; i<, total_image_lines; i++), thereafter, an image_line variable is set equal to the variable I, and another for loop is initialized, for (j=0; j<=DestWidth; j++), and ((pDst−(image_line*DstDelta))−j) is set equal to (pSrc+(image_line*SrcDelta)+j), hence each of the remaining lines, that is lines '9' and '10' are transferred sequentially from the source memory to the display memory based on the angle of rotation of 180 degree. The method terminates at step 708.

Figure 8:
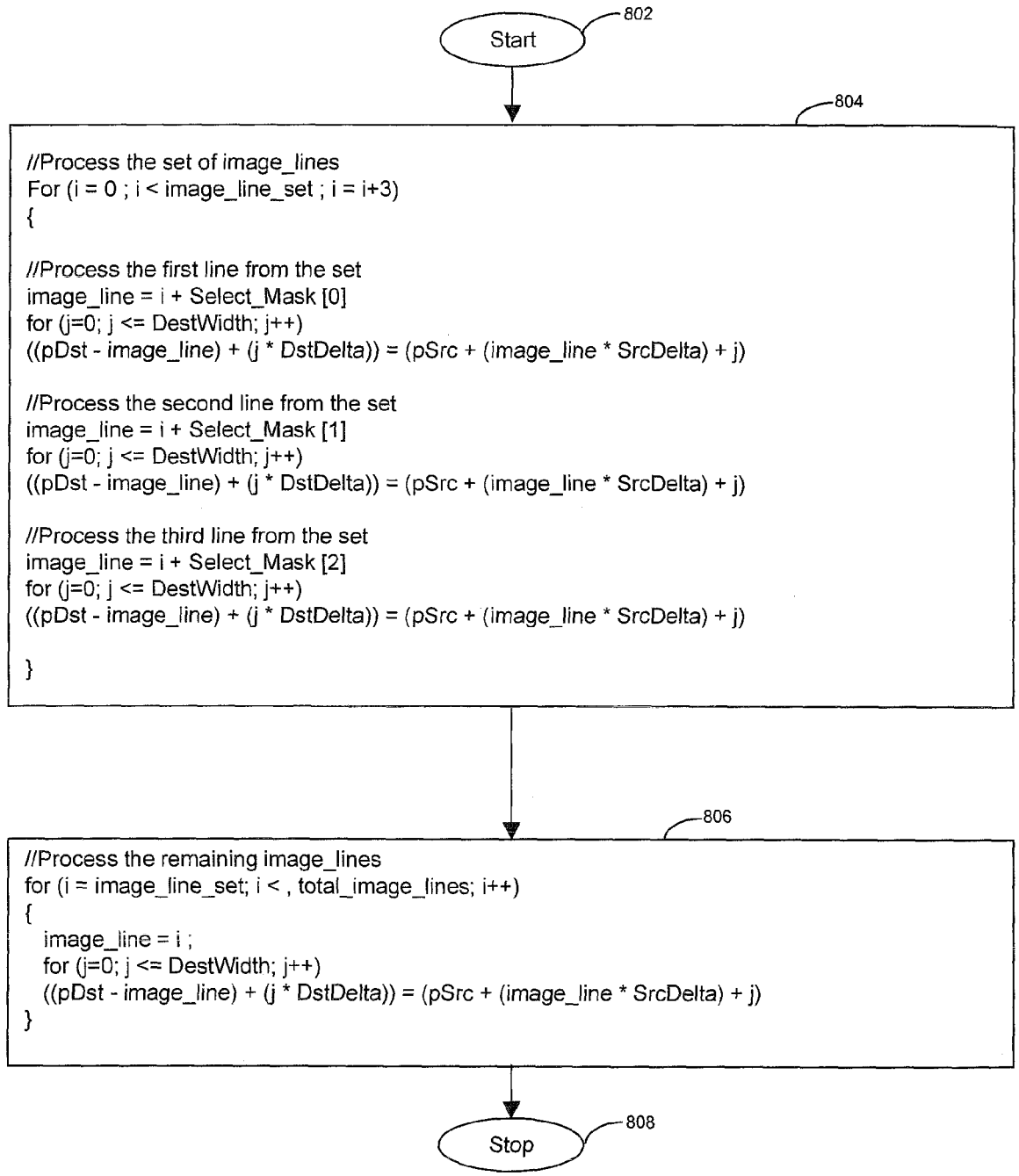
FIG. 8 is a flow diagram illustrating an algorithm for rotation of the image at an angle of 270 degree, according to an embodiment of the present invention.

FIG. 8 is a flow diagram illustrating a pseudo code for rotation of the image at an angle of 270 degree, according to an embodiment of the present invention. The algorithm includes initialization of a plurality of variables that are used for rotating the image at the angle of rotation of 270 degree.

The plurality of variables include SrcWidth, SrcHeight, DstWidth, DstHeight, SrcPtr, DestPtr, SrcDelta, DstDelta, total_image_lines, pSrc, pDst and Image_line_set. The SrcWidth variable is set equal to the width of the image in pixels in the source memory. The SrcHeight variable is set equal to the height of the image in pixels in the source memory. The DstWidth variable is set equal to width of the image in pixels in a display memory. The DstHeight variable is set equal to height of the image in pixels in the display memory. The SrcPtr is the source memory base pointer, and the DestPtr is a destination memory (i.e. Display memory) base pointer.

The SrcDelta is set equal to the product of the SrcWidth variable and the size of pixel. The DstDelta is set equal to the product of the DstWidth variable and the size of pixel. The total_image_lines variable is set equal to the DstHeight variable. The pSrc variable is set equal to the SrcPtr variable. The pDst variable is set equal to a sum of DestPtr and the Dstwidth variable. The image_line_set variable is set equal to integer value of (DstHeight/size of (mask_set))*(size of (mask_set)).

The size of (mask_set) signifies the number of integers in a particular row of an array mask_set [5] [3]. For example, in the mask_set [5] [3], the number of integers are 3, therefore the size of (mask_set) is equal to 3. Thus, the image_line_set is set equal to a multiple of size of (mask_set). For example, if the total lines to be transferred is 11, then the image_line_set is set equal to integer value of (DstHeight/size of (mask_set))*(size of (mask_set)), therefore integer value of (11/3)*3, which is set equal to 9. The method is initiated at step 802.

At step 804, a pseudo code is used for rotating the image at the angle of rotation of 270 degree. The pseudo code includes rotating the image_lines selected in a random order in a block size of size of (mask_set). Further, the block of image_lines is determined based on applying an index variable to a predetermined Select_Mask.

Thereafter, a for loop is initialized, and set as for (i=0; i<image_line_set; i i+3). Thereafter, image_line is set equal to i+Select_Mask [0], and another for loop is initialized, for (j=0; j<=DestWidth; j++), and ((pDst−image_line)+*DstDelta)) is set equal to (pSrc+(image_line*SrcDelta)+j), thereafter, image_line is set equal to i+Select_Mask [1], and another for loop is initialized, for (j=0; j<=DestWidth; j++), and ((pDst−image_line)+(j*DstDelta)) is set equal to (pSrc+(image_line*SrcDelta)+thereafter, image_line is set equal to i+Select_Mask [2], and another for loop is initialized, for (j=0; j<=DestWidth; j++), and ((pDst−image_line)+(j*DstDelta)) is set equal to (pSrc+(image_line*SrcDelta)+j).

The said pseudo code results in each of the three image_lines selected randomly to be transferred sequentially from the source memory to the display memory oriented at the angle of rotation of 270 degree in the display memory. Thereafter, the value of i is incremented and the above mentioned pseudo code is repeated till each of the lines in the image_line_set is transferred sequentially to the display memory.

For example, if i=0, we determine i+[+1, +2, +0] and transfer order is line [4, 2, 0], that is image lines '1', '2' and '0' are selected in the source memory and transferred to the display memory based on the angle of rotation of 270 degree, thereafter, i is incremented by 3, and i is now updated to 3, then i is set as i+[+4, +2, +0], and transfer order of the image lines is [4, 5, 3], that is image lines '4', '5' and '3' are selected in the source memory and transferred to the display memory based on the angle of rotation of 270 degree, thereafter i is incremented by 3, and i is now updated to 6, then i is set as i+[+1, +2, +0], and transfer order of the image lines is [7, 8, 6], that is image lines '7', '8' and '6' are selected in the source memory and transferred to the display memory based on the angle of rotation of 270 degree.

Thereafter, at step 806, the pseudo code is used for transferring the remaining lines, i.e. 2 lines left from among the 11 lines to the display memory from the source memory. The for loop is initialized and set equal to for (i=image_line_set; i<, total_image_lines; i++), thereafter, an image_line variable is set equal to the variable I, and another for loop is initialized, for (j=0; j<=DestWidth; j++), and ((pDst−image_line)+(j*DstDelta)) is set equal to (pSrc+(image_line*SrcDelta)+j), hence each of the remaining lines, that lines '9' and '10' are transferred sequentially from the source memory to the display memory based on the angle of rotation of 270 degree. The method terminates at step 808.

In the foregoing embodiments, the algorithms and pseudo code described is implemented as driver. Further groups of lines in the source image, or memory, are transferred into the display memory by incrementing the index variable by a fixed incremental value (size of (mask_set)). In alternative embodiments, the pixels in each line of the source image, or memory, can be transferred in a non-sequential transfer order. In another alternative embodiment, the index variable may be incremented with different values to increase the random nature of the non-sequential transfer order of lines in the source image. For example, for a mask having three constant values (e.g., 1, 2, 0), the first group of three lines may be transferred with index value i=0. Then, instead of incrementing i by 3, i may be incremented by 6 to transfer lines 7, 8, and 6. Then, i may be given a value of 3 to transfer lines 4, 5, and 3, and so on. In yet another embodiment, the selected image_lines could be transferred randomly (for example, by the use of yet another mask) from the source memory to the display memory.

In accordance with another embodiment, the methods described herein may be embodied within a program to be executed by a processor. The program may include different code sections, each dedicated to performing different steps of the method described herein. The code sections may be embodied within any one of a variety of computer-readable mediums. The processor may be a CPU in a personal computer.

The present invention is described herein in connection with a number of exemplary embodiments. However, the invention is not intended to be limited to the specific forms set forth herein. It is understood that various omissions, substitutions of equivalents are contemplated as circumstances may suggest or render expedient, but is intended to cover the application or implementation without departing from the spirit or scope of the claims of the present invention. Also, it is to be understood that the phraseology and terminology used herein is for the purpose of description and should not be regarded as limiting.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated.

What is claimed is:

1. A method for displaying an image in a display device, comprising:
   selecting a mask;
   receiving control information for a source image; and
   changing an orientation of the source image using the mask,
   wherein the mask includes a plurality of constant values that control transfer of image lines in the source image to a display memory, the constant values arranged within the mask to cause the image lines to be transferred in a non-sequential order based on the control information, wherein each constant value controls transfer of a different one of the image lines in the source image to the display memory.

2. The method of claim 1, wherein said changing includes:
   transferring image lines in the source image to the display memory in said non-sequential order based on the constant values in the mask.

3. The method of claim 2, wherein said transferring includes:
   applying an index variable to the mask to transfer a first group of image lines in the source image to the display memory; and
   incrementing the index variable by a size of the mask to transfer remaining groups of image lines in the source image to the display memory.

4. The method of claim 3, wherein after transfer of remaining groups of image lines and if there are remaining image lines less than the size of mask, the remaining image lines are transferred sequentially to the display memory.

5. The method of claim 3, wherein each of the plurality of masks has a different order of constant values that control transfer of image lines in the source image in a different non-sequential order.

6. The method of claim 5, wherein each mask has a same number of constant values.

7. The method of claim 5, wherein each mask has the same constant values arranged in a different order.

8. The method of claim 5, wherein a number of constant values in the mask controls a number of image lines in the source image that are transferred in each iteration of the index variable.

9. The method of claim 5, wherein said incrementing includes:
   incrementing the index variable with a size of mask,
   wherein the size of mask is set based on the plurality of values in the mask.

10. The method of claim 1, wherein the control information includes an angle of rotation for the source image.

11. The method of claim 1, further comprising:
    displaying the changed orientation of the source image based on the transfer of image lines into the display memory.

12. A system for displaying an image in a display device, comprising:
    a computer readable medium to store at least one mask; and
    a processor to change an orientation of a source image using the mask,
    wherein the mask includes a plurality of constant values that control transfer of image lines in the source image to a display memory, the constant values arranged within the mask to cause the image lines to be transferred in a non-sequential order based on control information, and wherein each constant value controls transfer of a different one of the image lines in the source image to the display memory.

13. The system of claim 12, wherein the processor transfers image lines in the source image to the display memory in said non-sequential order based on the constant values in the mask.

14. The system of claim 13, wherein the processor:
    generates a random number;
    selects the mask from a plurality of masks stored in said memory based on the random number;
    applies an index variable to the mask to transfer a first group of image lines in the source image to the display memory; and
    increments the index variable by a size of mask to transfer remaining groups of image lines in the source image to the display memory, wherein the size of mask is set based on the plurality of values in the mask.

15. The system of claim 14, wherein after the transfer of remaining groups of image lines and if there are remaining image lines less than the size of mask, the remaining image lines are transferred sequentially to the display memory.

16. The system of claim 14, wherein each of the plurality of masks has a different order of constant values that control transfer of image lines in the source image in a different non-sequential order.

17. The system of claim 16, wherein each mask has a same number of constant values.

18. The system of claim 16, wherein each mask has the same constant values arranged in a different order.

19. The system of claim 16, wherein a number of constant values in the mask controls a number of image lines in the source image that are transferred in each iteration of the index variable.

20. The system of claim 16, wherein said incrementing includes:
    incrementing the index variable with a size of mask,
    wherein the size of mask is set based on the plurality of values in the mask.

21. The system of claim 12, wherein the control information includes an angle of rotation for the source image.

22. The system of claim 12, wherein the processor controls display of the changed orientation of the source image based on the transfer of image lines into the display memory.

23. A method for displaying an image in a display device, comprising:
    randomly selecting one of a plurality of the masks stored in a memory;

receiving control information for a source image; and
changing an orientation of the source image using the selected mask,
wherein the mask is used to transfer image lines in the source image to a display memory in a non-sequential order based on the control information.

24. The method of claim 23, wherein:
each of the masks includes a plurality of constant values,
image lines in the source image are transferred to the display memory in said non-sequential order based on the constant values in the selected mask, and
each constant value in the selected mask controls transfer of a different one of the image lines in the source image to the display memory.

25. The method of claim 24, wherein each of the plurality of masks has a different order of the same constant values that control transfer of image lines in the source image in a different non-sequential order.

26. The method of claim 24, wherein each mask has a same number of constant values.

27. The method of claim 24, wherein image lines in the source image are transferred by: applying an index variable to the selected mask to transfer a first group of lines in the source image to the display memory; and incrementing the index variable by a size of mask to transfer remaining groups of lines in the source image to the display memory, wherein the size of mask is set based on the plurality of values in the mask.

28. The method of claim 27, wherein after the transfer of remaining groups of lines and if there are remaining image lines of less than the size of the mask, the remaining image lines are transferred sequentially to the display memory.

29. The method of claim 27, wherein a number of constant values in the selected mask controls a number of lines in the source image that are transferred in each iteration of the index variable.

30. The method of claim 27, wherein said incrementing includes: incrementing the index variable with the size of (mask).

31. The method of claim 23, further comprising:
displaying the changed orientation of the source image based on the transfer of source image lines into the display memory.

32. A computer-implemented method for transferring image information from a source memory to a display memory for presentation on a computer display, the image information comprising a plurality of image lines, each image line comprising a plurality of pixels, the transfer causing an image to be presented on the computer display conforming in orientation to one of a plurality of selectable orientations with respect to the computer display, the method comprising:
determining one of the plurality of selectable orientations as the selected orientation;
calculating a first increment parameter from the selected orientation; and
selecting image lines in the source memory in a non-sequential order,
for each image line:
stepping seriatim through each pixel of the image line,
for each pixel:
transferring the value of that pixel to a display memory location indicated by a display memory pointer;
updating the display memory pointer after each pixel transfer by adding the first increment parameter to the display memory pointer; and
updating the display memory pointer after each image line by adding different increment parameters to the display memory pointer to transfer image lines in the source memory in said non-sequential order.

33. The method of claim 32, wherein the non-sequential transfer order of image lines is determined randomly based on a selection of one of a plurality of masks, each mask including constant values that control a different non-sequential transfer order of the image lines in the source memory.

* * * * *